(12) United States Patent
Hwang et al.

(10) Patent No.: US 12,535,375 B2
(45) Date of Patent: Jan. 27, 2026

(54) BATTERY CELL INTERNAL PRESSURE MEASUREMENT APPARATUS

(71) Applicant: LG ENERGY SOLUTION, LTD., Seoul (KR)

(72) Inventors: In-Seob Hwang, Daejeon (KR); Kyung-Min Lee, Daejeon (KR); Chang-Hyun Hwang, Daejeon (KR); Bong-Hyun Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 294 days.

(21) Appl. No.: 18/278,222

(22) PCT Filed: Oct. 18, 2022

(86) PCT No.: PCT/KR2022/015897
§ 371 (c)(1),
(2) Date: Aug. 22, 2023

(87) PCT Pub. No.: WO2023/085632
PCT Pub. Date: May 19, 2023

(65) Prior Publication Data
US 2024/0133761 A1    Apr. 25, 2024
US 2024/0230444 A9    Jul. 11, 2024

(30) Foreign Application Priority Data

Nov. 12, 2021   (KR) .......................... 10-2021-0156089

(51) Int. Cl.
*G01L 19/00*      (2006.01)
(52) U.S. Cl.
CPC ................. *G01L 19/0092* (2013.01)

(58) Field of Classification Search
None
See application file for complete search history.

(56) References Cited

U.S. PATENT DOCUMENTS

| 2017/0108326 A1 | 4/2017 | Hopkins | |
| 2021/0020997 A1* | 1/2021 | Lee | H01M 10/4228 |
| 2021/0226265 A1* | 7/2021 | Lee | H01M 10/486 |

FOREIGN PATENT DOCUMENTS

| JP | 2004-152732 A | 5/2004 |
| JP | 2013-058348 A | 3/2013 |

(Continued)

OTHER PUBLICATIONS

International Search Report (with partial translation) and Written Opinion for PCT/KR2022/015897, dated Jan. 20, 2023.

(Continued)

*Primary Examiner* — Eric S. McCall
*Assistant Examiner* — Nigel H Plumb
(74) *Attorney, Agent, or Firm* — Morgan, Lewis & Bockius LLP

(57) ABSTRACT

A battery cell internal pressure measurement apparatus for measuring an internal pressure of at least one battery cell according to an example embodiment of the present disclosure may include a jig housing configured to accommodate the at least one battery cell, and a jig cover coupled to the jig housing and configured to cover the at least one battery cell. The at least one cell groove into which the at least one battery cell is inserted may be formed at a bottom of the jig housing.

14 Claims, 6 Drawing Sheets

(56) References Cited

FOREIGN PATENT DOCUMENTS

| | | | | |
|---|---|---|---|---|
| JP | 2015-056308 | A | 3/2015 | |
| JP | 2015-153731 | A | 8/2015 | |
| JP | 2017-181212 | A | 10/2017 | |
| JP | 2017-212163 | A | 11/2017 | |
| KR | 10-2010-0088927 | A | 8/2010 | |
| KR | 10-2012-0050667 | A | 5/2012 | |
| KR | 10-2016-0072571 | A | 6/2016 | |
| KR | 20160072571 | A * | 6/2016 | ............... G01N 1/22 |
| KR | 10-2017-0042973 | A | 4/2017 | |
| KR | 10-2017-0083214 | A | 7/2017 | |
| KR | 10-2018-0113212 | A | 10/2018 | |
| KR | 10-2019-0107933 | A | 9/2019 | |
| KR | 10-2160339 | B1 | 9/2020 | |

OTHER PUBLICATIONS

Office Action dated Sep. 9, 2024 issued in Japanese Patent Application No. 2023-552561.

Extended European Search Report dated Feb. 20, 2025 issued in corresponding European Patent Application No. 22893055.8. (Note: US 2021/226265 A1 and KR 10-2016-0072571 A already submitted).

* cited by examiner

BATTERY CELL INTERNAL PRESSURE MEASUREMENT APPARATUS

TECHNICAL FIELD

The present disclosure relates to a battery cell internal pressure measurement apparatus.

The present application claims priority to Korean Patent Application No. 10-2021-0156089 filed on Nov. 12, 2021 in the Republic of Korea, the disclosures of which are incorporated herein by reference.

BACKGROUND ART

Secondary batteries have high applicability according to product groups and electrical characteristics such as high energy density, and thus, are commonly applied not only to mobile devices but also to electric vehicles (EVs) or hybrid vehicles (HEVs) driven by electric power sources. Because secondary batteries may radically reduce the use of fossil fuel and do not generate any by-products that come with energy consumption, the secondary batteries are gaining attention as a new alternative energy source for improving eco-friendliness and energy efficiency.

Types of secondary batteries that are currently widely used include lithium-ion batteries, lithium polymer batteries, nickel cadmium batteries, nickel hydride batteries, and nickel zinc batteries. An operating voltage of a unit secondary battery cell, that is, a unit battery cell, ranges from about 2.5 V to about 4.5 V. Accordingly, when a higher output voltage is required, a battery pack may be configured by connecting a plurality of battery cells in series. Also, a battery pack may be configured by connecting a plurality of battery cells in parallel according to charge/discharge capacity required for the battery pack. Accordingly, the number of battery cells included in a battery pack may be set in various ways according to a required output voltage or charge/discharge capacity.

When a battery pack is configured by connecting a plurality of battery cells in series/parallel, a method of first configuring a battery module including at least one battery cell and adding other elements by using the at least one battery module to configure a battery pack is general.

In the case of such a conventional battery cell, there is a requirement that the battery cell should not be vented at a predetermined temperature and for a predetermined time for safety or durability (no vent) among internal quality items during the manufacturing process. The predetermined temperature and predetermined time are generally 60° C. and 180 days, and at the predetermined temperature and for the predetermined time, at least one battery cell is stored in a specific container or place to carry out the measurement test by checking the internal pressure of the battery cell.

However, this conventional internal pressure measurement test consumes a lot of time, manpower, and cost according to the test, and is not a fundamental no-vent solution, so it is required to find a solution to provide a more improved internal pressure measurement apparatus for a battery cell.

DISCLOSURE

Technical Problem

Accordingly, the object of the present disclosure is to provide a battery cell internal pressure measurement apparatus capable of improving internal pressure measurement efficiency of at least one battery cell.

Technical Solution

In one aspect of the present disclosure, there is provided a battery cell internal pressure measurement apparatus for measuring an internal pressure of at least one battery cell, comprising: a jig housing configured to accommodate the at least one battery cell; and a jig cover coupled to the jig housing and configured to cover the at least one battery cell, wherein at least one cell groove into which the at least one battery cell is inserted is formed on a bottom of the jig housing.

The at least one cell groove may be formed in a shape corresponding to the shape of the at least one battery cell.

The jig housing and the jig cover may be mutually screwed together through at least one fastening unit.

The battery cell internal pressure measurement apparatus may further comprise at least one sealing member provided between the jig housing and the jig cover.

The at least one sealing member may be disposed along an edge of the jig housing and the jig cover.

The at least one sealing member may be provided as an O-ring.

The battery cell internal pressure measurement apparatus may further comprise at least one pressure measurement unit provided to the jig cover and configured to measure a gas pressure inside the jig housing.

The at least one pressure measurement unit may be equipped with at least one pressure sensor.

The battery cell internal pressure measurement apparatus may further comprise at least one temperature measurement unit provided to the jig cover and configured to measure a temperature change inside the jig housing.

The at least one temperature measurement unit may be equipped with at least one temperature sensor.

The battery cell internal pressure measurement apparatus may further comprise a valve unit provided to the jig cover and configured to control inflow and outflow of gas into the jig housing.

The valve unit may include a purging valve configured to purge an inert gas from the outside of the jig cover into the inside of the jig housing; and a collection valve configured to collect an internal gas in the jig housing.

The at least one battery cell may be a pouch-type secondary battery.

Advantageous Effects

According to various embodiments as described above, a battery cell internal pressure measurement apparatus capable of improving internal pressure measurement efficiency of at least one battery cell may be provided.

DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODES OF PRACTICE

The present disclosure will now be described more fully with reference to the accompanying drawings, in which exemplary embodiments of the present disclosure are shown. These embodiments are provided so that the present disclosure will be thorough and complete, and will fully convey the concept of the present disclosure to one of ordinary skill in the art, and the present disclosure may be embodied in many different forms and should not be construed as being limited to the embodiments set forth herein. In addition, in order to help the understanding of the present disclosure, the accompanying drawings are not drawn to scale, but dimensions of some components may be exaggerated.

Figure 1:
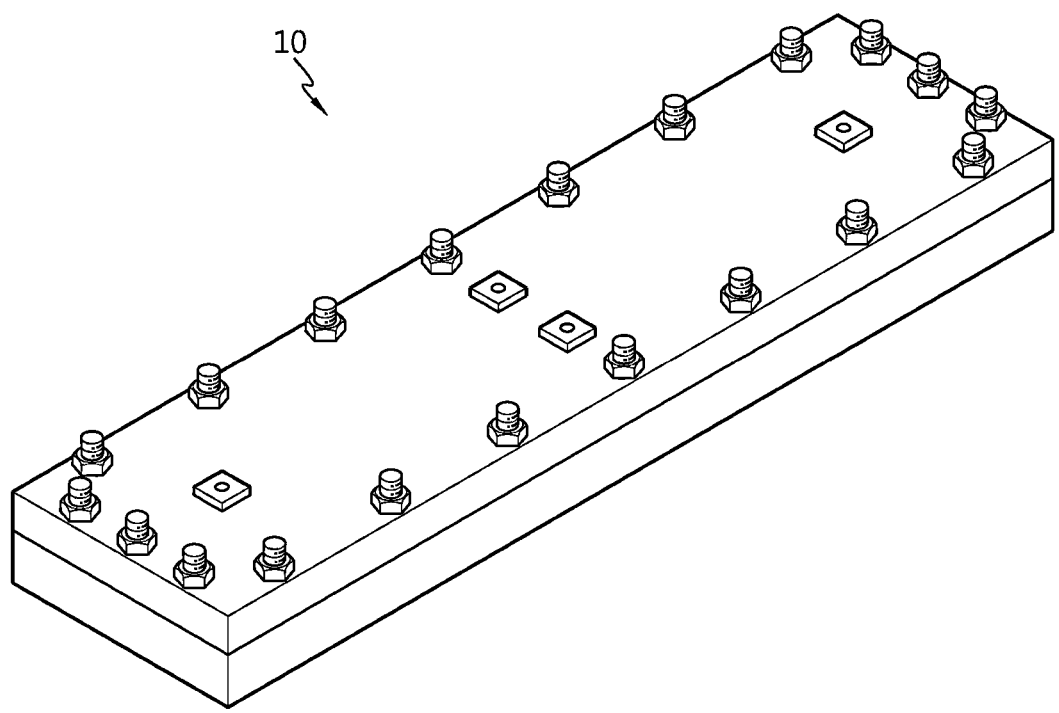
FIG. 1 is a view for describing a battery cell internal pressure measurement apparatus according to an embodiment of the present disclosure.
Figure 2:
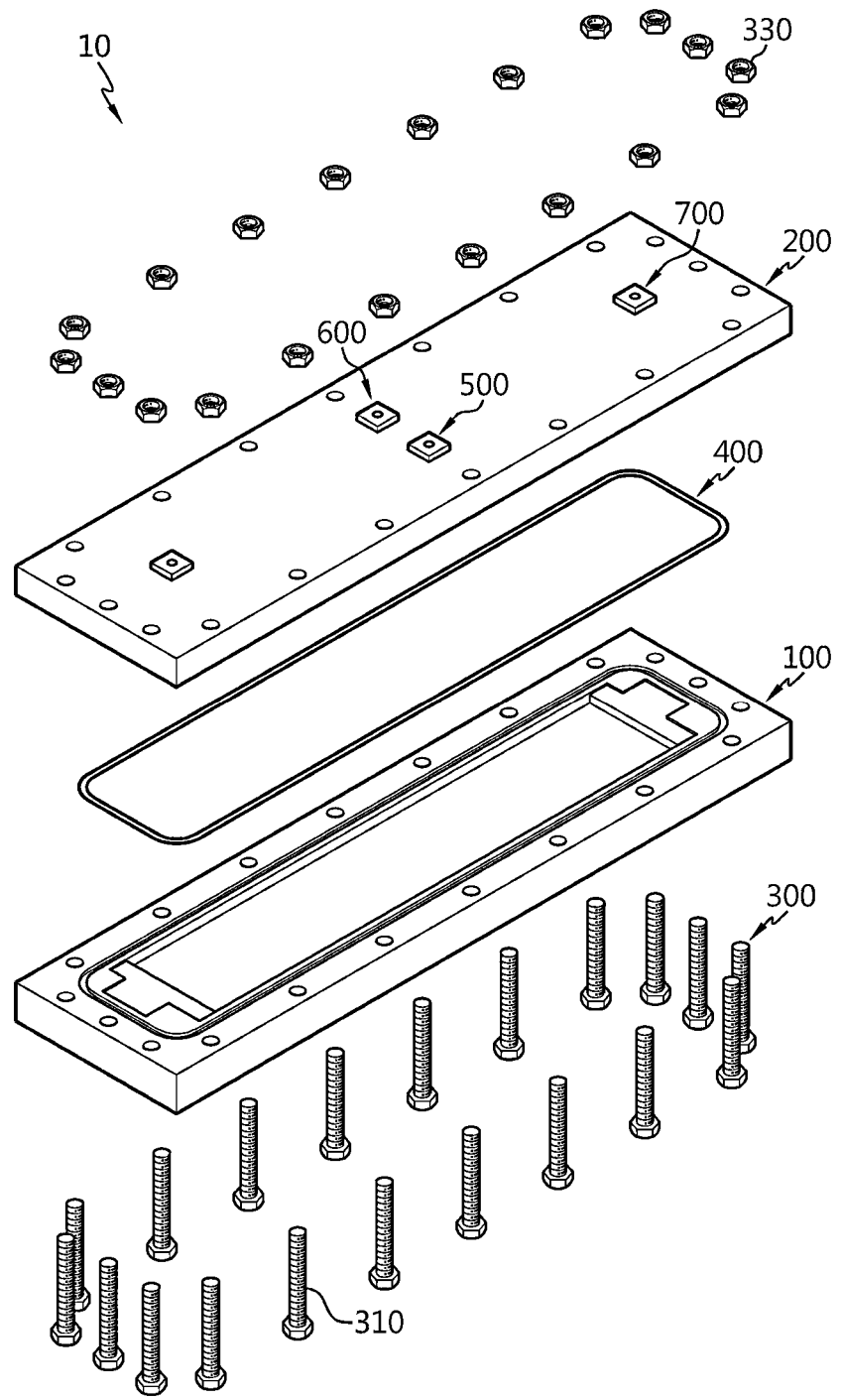
FIG. 2 is an exploded perspective view of the battery cell internal pressure measurement apparatus of FIG. 1.

FIG. 1 is a view for describing a battery cell internal pressure measurement apparatus according to an embodiment of the present disclosure, and FIG. 2 is an exploded perspective view of the battery cell internal pressure measurement apparatus of FIG. 1.

Figure 8:
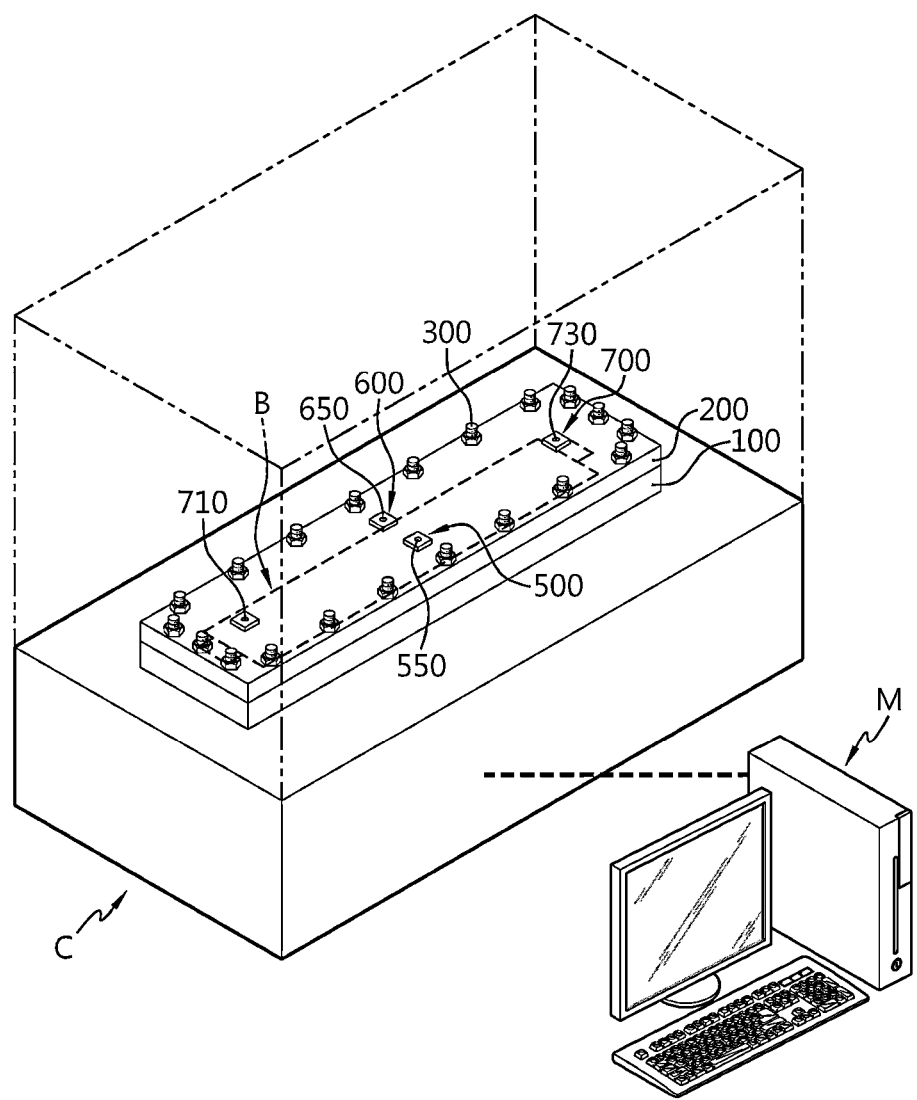
FIG. 8 is a view for describing measurement of an internal pressure of a battery cell through the battery cell internal pressure measurement apparatus of FIG. 1.

Referring to FIGS. 1 and 2, a battery cell internal pressure measurement apparatus may be a device for measuring the internal pressure of at least one battery cell (B, see FIG. 8). The at least one battery cell B is a secondary battery and may be a pouch-type secondary battery, a cylindrical secondary battery, or a prismatic secondary battery. Hereinafter, in this embodiment, the at least one battery cell B is described as a pouch-type secondary battery.

The battery cell internal pressure measurement apparatus 10 may include a jig housing 100 and a jig cover 200.

The jig housing 100 may accommodate the at least one battery cell B. To this end, an accommodation space capable of accommodating the at least one battery cell B may be provided in the jig housing 100.

Hereinafter, the jig housing 100 according to this embodiment will be described in more detail.

Figure 3:
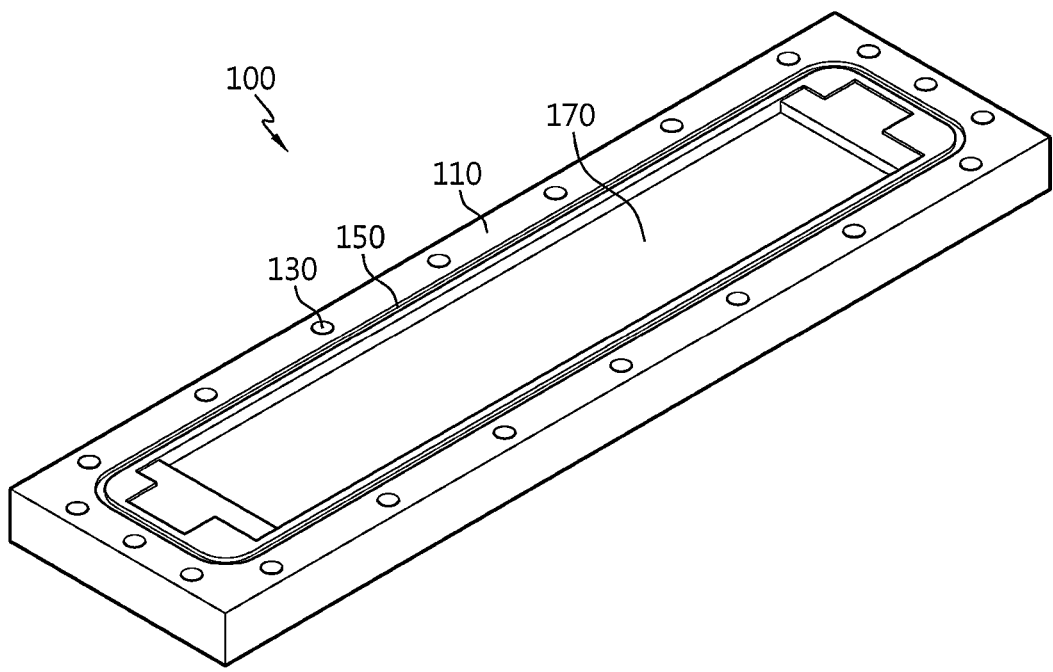
FIG. 3 is a view for describing a jig housing of the battery cell internal pressure measurement apparatus of FIG. 2.
Figure 4:
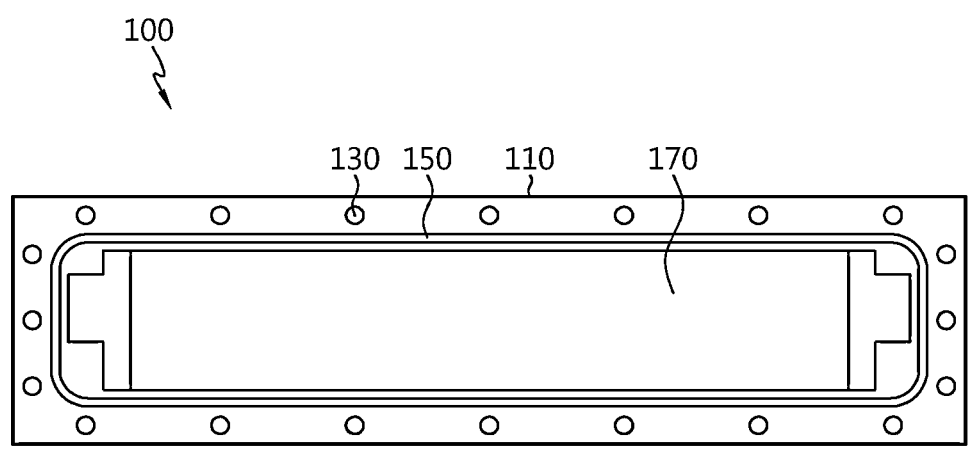
FIG. 4 is a bottom view of the jig housing in FIG. 3.
Figure 5:
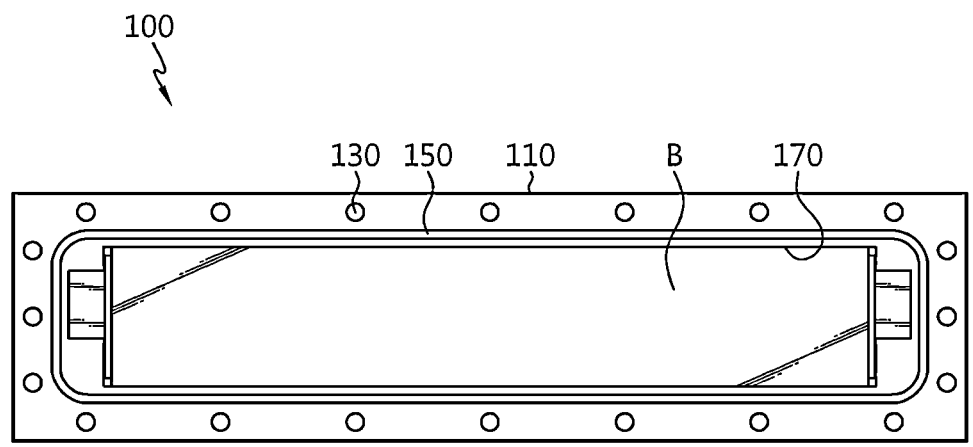
FIG. 5 is a view for describing that a battery cell is mounted in the jig housing of FIG. 4.

FIG. 3 is a view for describing a jig housing of the battery cell internal pressure measurement apparatus of FIG. 2, FIG. 4 is a bottom view of the jig housing in FIG. 3, and FIG. 5 is a view for describing that a battery cell is mounted in the jig housing of FIG. 4.

Referring to FIGS. 3 to 5, the jig housing 100 may include a housing body 110, a housing fastening hole 130, a sealing member insertion hole 150, and a cell groove 170.

The housing body 110 forms the appearance of the jig housing 100 and may form the accommodation space.

The housing fastening hole 130 is provided in the housing body 110, and a fastening unit 300 described later may be fastened through the housing fastening hole 130. The housing fastening hole 130 may be provided in plurality. The plurality of housing fastening holes 130 may be formed along the edge of the housing body 110. The plurality of housing fastening holes 130 may be arranged to be spaced apart from each other by a predetermined distance.

The sealing member insertion hole 150 is provided in the housing body 110, and a sealing member 400 described later may be inserted. The sealing member insertion hole 150 may be provided between the plurality of fastening holes 130 along the edge of the housing body 110 and the cell groove 170 to be described later.

The cell groove 170 is provided on the housing body 110, and the at least one battery cell B can be inserted into the cell groove 170. The cell groove 170 may be formed in a shape corresponding to the shape of the at least one battery cell B to more stably support the at least one battery cell B.

Again, referring to FIGS. 1 and 2, the jig cover 200 is coupled with the jig housing 100 and may cover the at least one battery cell B.

Hereinafter, the jig cover 200 according to this embodiment will be described in more detail.

Figure 6:
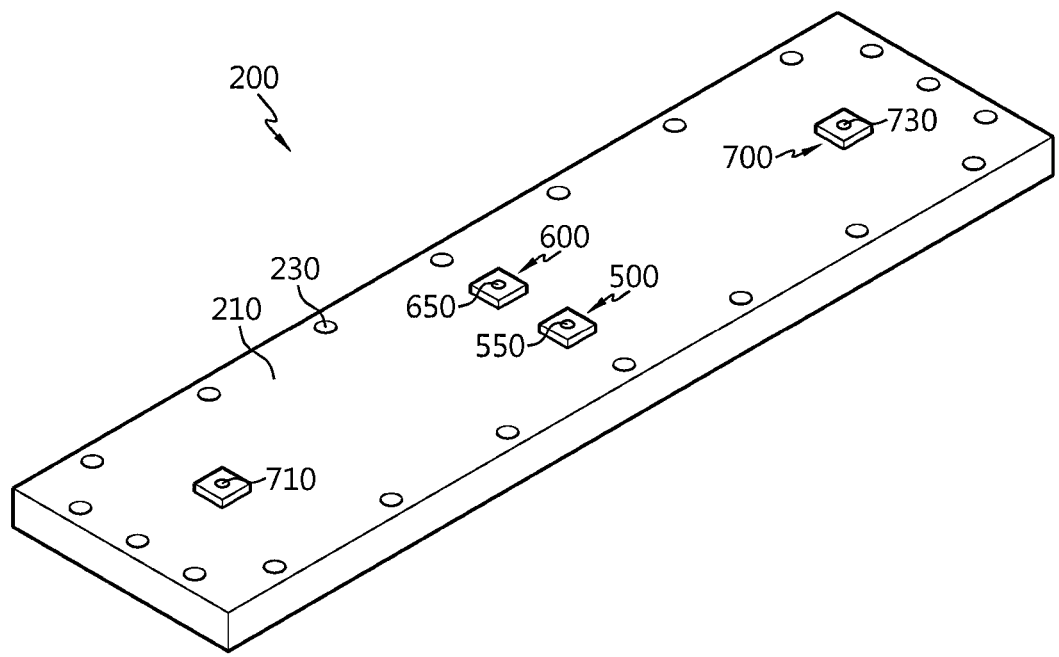
FIG. 6 is a view for describing a jig cover of the battery cell internal pressure measurement apparatus of FIG. 1.
Figure 7:
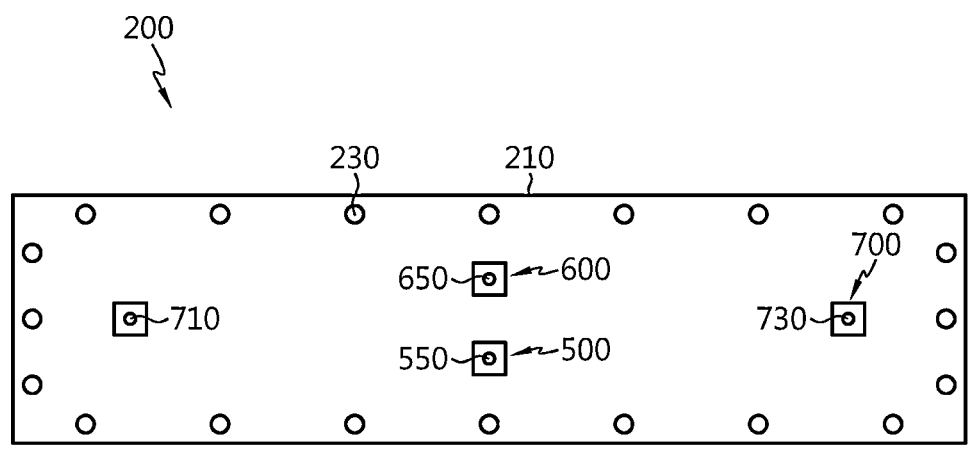
FIG. 7 is a plan view of the jig cover of FIG. 6.

FIG. 6 is a view for describing a jig cover of the battery cell internal pressure measurement apparatus of FIG. 1, and FIG. 7 is a plan view of the jig cover of FIG. 6.

Referring to FIGS. 6 and 7, the jig cover 200 may include a cover body 210 and a cover fastening hole 230.

The cover body 210 may form the appearance of the jig cover 200. A pressure measurement unit 500, a temperature measurement unit 600, and a valve unit 700 described later may be mounted on the cover body 210.

The cover fastening hole 230 is provided in the cover body 210, and a fastening unit 300 described later may be fastened through the cover fastening hole 230. The cover fastening hole 230 may be provided in plurality. The plurality of cover fastening holes 230 may be formed along the edge of the cover body 210. The plurality of cover fastening holes 230 may be arranged to be spaced apart from each other by a predetermined distance, and may be provided at positions corresponding to the plurality of fastening holes 130 of the jig housing 100.

At least one fastening unit 300 to be described below may be fastened through the plurality of fastening holes 230 of the jig cover 200 and the plurality of housing fastening holes 130 of the jig housing 100. Accordingly, the jig housing 100 and the jig cover 200 may be mutually screwed through the at least one fastening unit 300.

Again, referring to FIGS. 1 and 2, the battery cell internal pressure measurement apparatus 10 may further include a fastening unit 300.

The fastening unit 300 is for mutual coupling of the jig housing 100 and the jig cover 200, and may be provided in at least one or more or in plurality. Hereinafter, in this embodiment, the fastening unit 300 will be described as being provided in plurality.

The plurality of fastening units 300 may include a bolting member 310 and a nut member 330.

The bolting member 310 is formed to have a predetermined length with a predetermined screw thread, and may be fastened through the housing fastening hole 130 of the jig housing 100 and the cover fastening hole 230 of the jig cover 200.

The nut member 330 is formed to be screwed with the bolting member 310, and may be coupled with an end of the bolting member 310 that protrudes out of the cover fastening hole 230 on the upper side of the jig cover 200.

Through such fastening coupling of the bolting member 310 and the nut member 330, the jig housing 100 and the jig cover 200 may be more firmly coupled to each other. The battery cell internal pressure measurement apparatus 10 may further include a sealing member 400.

The sealing member 400 is for more robust sealing between the jig housing 100 and the jig cover 200, and may be provided in at least one or more or in plurality.

The at least one sealing member 400 may be provided between the jig housing 100 and the jig cover 200. Specifically, the at least one sealing member 400 may be disposed along the edges of the jig housing 100 and the jig cover 200.

More specifically, the at least one sealing member 400 may be inserted into the sealing member insertion hole 150 of the jig housing 100. The at least one sealing member 400 may be provided as an O-ring.

The battery cell internal pressure measurement apparatus 10 may further include a pressure measurement unit 500.

Hereinafter, the pressure measurement unit 500 will be described in more detail with further reference to FIGS. 6 and 7.

The pressure measurement unit 500 is for measuring the gas pressure inside the jig housing 100, that is, the internal pressure, and is provided in at least one or more or in plurality, and may be provided to the jig cover 200. The at least one pressure measurement unit 500 may be equipped with at least one pressure sensor 550.

The battery cell internal pressure measurement apparatus 10 may further include a temperature measurement unit 600.

Hereinafter, the temperature measurement unit 600 will be described in more detail with further reference to FIGS. 6 and 7.

The temperature measurement unit 600 is for measuring the temperature change inside the jig housing 100, and is provided in at least one or more or in plurality, and may be provided to the jig cover 200. The at least one temperature measurement unit 600 may be equipped with at least one temperature sensor 650.

The battery cell internal pressure measurement apparatus 10 may further include a valve unit 700.

Hereinafter, the valve unit 700 will be described in more detail with further reference to FIGS. 6 and 7.

The valve unit 700 is provided to the jig cover 200 and may control the inflow and outflow of gas into the jig housing 100.

The valve unit 700 may include a purging valve 710 and a collection valve 730.

The purging valve 710 is for purging an inert gas from the outside of the jig cover 200 to the inside of the jig housing 100, and may be provided on one side of the jig cover 200. The inert gas may be provided as argon or nitrogen.

The collection valve 730 is for collecting an internal gas in the jig housing 100, and may be provided on the other side of the jig cover 200.

Hereinafter, the internal pressure measurement mechanism of the battery cell (B, see FIG. 8) through the battery cell internal pressure measurement apparatus 10 according to this embodiment will be described in more detail.

FIG. 8 is a view for describing measurement of an internal pressure of a battery cell through the battery cell internal pressure measurement apparatus of FIG. 1.

Referring to FIG. 8, a worker or the like may put a cell-pierced battery cell B to be measured into the battery cell internal pressure measurement apparatus 10, and then fasten the jig housing 100 and the jig cover 200 through the fastening unit 300.

Here, the battery cell B to be measured may be a battery cell in which cell piercing for measurement or the like has been performed. Meanwhile, cell piercing may be performed at the pouch terraces on both sides of the battery cell B, but only one side of the pouch may be pierced.

Thereafter, the worker or the like may proceed with nitrogen purging into the jig housing 100 through the purging valve 710 of the valve unit 700. When purging of the nitrogen or the like is completed, the purging valve 710 may be closed.

The worker or the like may put the battery cell internal pressure measurement apparatus 10 into which the battery cell B is inserted into a chamber at a predetermined temperature and measure the internal pressure of the battery cell B. Here, the pressure measurement unit 500 and the temperature measurement unit 600 of the battery cell internal pressure measurement apparatus 10 may be connected to a control unit M capable of monitoring internal pressure or temperature.

The worker or the like may continuously measure pressure or temperature data through the control unit M connected to the pressure measurement unit 500 and the temperature measurement unit 600.

Even if a vent occurs in the battery cell B during the measurement test, the battery cell internal pressure measurement apparatus 10 according to this embodiment may check the amount of gas inside and the resulting pressure or the like through the above continuously measurable pressure or temperature data measurement mechanism regardless of the vent.

On the other hand, when the measurement test is finished, the worker or the like may collect the generated gas after the test is finished through the collection valve 730 of the valve unit 700.

As such, in this embodiment, through the battery cell internal pressure measurement apparatus 10, the internal pressure or temperature data of the battery cell B to be measured may be measured more effectively.

According to various embodiments as described above, the battery cell internal pressure measurement apparatus 10 capable of improving internal pressure measurement efficiency of at least one battery cell B may be provided.

While the preferred embodiments of the present disclosure have been shown and described, the present disclosure is not limited to the specific embodiments described above, various modifications may be made by one of ordinary skill in the art to which the present disclosure pertains without departing from the gist of the present disclosure as defined by the claims, and these modifications should not be individually understood from the technical feature or prospect of the present disclosure.

What is claimed is:

1. A battery cell internal pressure measurement apparatus for measuring an internal pressure of at least one battery cell, comprising:
    a jig housing configured to accommodate the at least one battery cell;
    a jig cover coupled to the jig housing and configured to cover the at least one battery cell; and
    at least one temperature measurement unit provided on an upper surface of the jig cover and configured to measure a temperature change inside the jig housing,
    wherein at least one cell groove into which the at least one battery cell is inserted is formed at a bottom of the jig housing.

2. The battery cell internal pressure measurement apparatus according to claim 1, wherein the at least one cell groove is formed in a shape corresponding to a shape of the at least one battery cell.

3. The battery cell internal pressure measurement apparatus according to claim 1, wherein the jig housing and the jig cover are mutually screwed together through at least one fastening unit.

4. The battery cell internal pressure measurement apparatus according to claim 1, further comprising at least one sealing member provided between the jig housing and the jig cover.

5. The battery cell internal pressure measurement apparatus according to claim 4, wherein the at least one sealing member is disposed along an edge of the jig housing and the jig cover.

6. The battery cell internal pressure measurement apparatus according to claim 4, wherein the at least one sealing member is provided as an O-ring.

7. The battery cell internal pressure measurement apparatus according to claim 1, further comprising at least one pressure measurement unit provided to the jig cover and configured to measure a gas pressure inside the jig housing.

8. The battery cell internal pressure measurement apparatus according to claim 7, wherein the at least one pressure measurement unit is equipped with at least one pressure sensor.

9. The battery cell internal pressure measurement apparatus according to claim 1, wherein the at least one temperature measurement unit is equipped with at least one temperature sensor.

10. The battery cell internal pressure measurement apparatus according to claim 1, further comprising a valve unit provided to the jig cover and configured to control inflow of gas into the jig housing and outflow of gas from the jig housing.

11. The battery cell internal pressure measurement apparatus according to claim 10, wherein the valve unit includes:
- a purging valve configured to purge an inert gas from an outside of the jig cover into an inside of the jig housing; and
- a collection valve configured to collect an internal gas in the jig housing.

12. The battery cell internal pressure measurement apparatus according to claim 1, wherein the at least one battery cell is a pouch-type secondary battery.

13. The battery cell internal pressure measurement apparatus according to claim 1, further comprising:
- at least one pressure measurement unit mounted on the upper surface of the jig cover and configured to measure a gas pressure inside the jig housing;
- a purging valve mounted on the upper surface of the jig cover and configured to supply gas from an outside of the jig cover into an inside of the jig housing; and
- a collection valve mounted on the upper surface of the jig cover and configured to collect an internal gas in the jig housing,
- wherein the at least one temperature measurement unit and the at least one pressure measurement unit are located side-by-side in a central region of the upper surface of the jig cover,
- wherein the purging valve is located in a first end region of the upper surface of the jig cover,
- wherein the collection valve is located in a second end region of the upper surface of the jig cover, and
- wherein the second end region is opposite to the first end region.

14. A battery cell internal pressure measurement apparatus for measuring an internal pressure of at least one battery cell, comprising:
- a jig housing configured to accommodate the at least one battery cell;
- a jig cover coupled to the jig housing and configured to cover the at least one battery cell; and
- a purging valve mounted on an upper surface of the jig cover and configured to supply gas from an outside of the jig cover into an inside of the jig housing,
- wherein at least one cell groove into which the at least one battery cell is inserted is formed at a bottom of the jig housing.

* * * * *